(12) United States Patent
Choi

(10) Patent No.: US 9,432,543 B2
(45) Date of Patent: Aug. 30, 2016

(54) IMAGE FORMING APPARATUS AND METHOD OF SUPPLYING POWER THEREOF

(71) Applicant: Samsung Electronics Co., Ltd, Suwon-si, Gyeonggi-do (KR)

(72) Inventor: Sung-kyu Choi, Pyeongtaek-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/134,209

(22) Filed: Dec. 19, 2013

(65) Prior Publication Data
US 2015/0009516 A1 Jan. 8, 2015

(30) Foreign Application Priority Data
Jul. 3, 2013 (KR) .................. 10-2013-0077918

(51) Int. Cl.
| | |
|---|---|
| G06K 15/00 | (2006.01) |
| H04N 1/00 | (2006.01) |
| H04N 1/40 | (2006.01) |
| H04N 7/00 | (2011.01) |
| G03F 3/08 | (2006.01) |
| H02M 7/06 | (2006.01) |
| G03G 15/00 | (2006.01) |

(52) U.S. Cl.
CPC ...... *H04N 1/00899* (2013.01); *G03G 15/5004* (2013.01); *G03G 15/80* (2013.01); *G06K 15/406* (2013.01); *H02M 7/06* (2013.01); *H04N 1/00891* (2013.01); *H04N 1/00896* (2013.01); *H04N 1/00904* (2013.01)

(58) Field of Classification Search
CPC .................. G09G 3/3266; G09G 2300/0809; H01L 27/12

USPC ..................... 358/1.14; 399/37, 88; 327/482; 345/211, 94

See application file for complete search history.

(56) References Cited

U.S. PATENT DOCUMENTS

| | | | | |
|---|---|---|---|---|
| 5,532,913 A | * | 7/1996 | Suzuki ..................... | H02M 7/48 363/109 |
| 6,741,239 B2 | * | 5/2004 | Iwasaki ..................... | G09G 3/36 345/211 |
| 7,362,298 B2 | * | 4/2008 | Wakabayashi ........ | G09G 3/3266 345/214 |

(Continued)

FOREIGN PATENT DOCUMENTS

| | | | |
|---|---|---|---|
| EP | 2405304 | * | 1/2012 |
| EP | 2405304 A2 | | 1/2012 |
| JP | 59-33479 | | 2/1984 |

OTHER PUBLICATIONS

Extended European Search Report mailed Nov. 27, 2014 in European Application No. 14151189.9.

*Primary Examiner* — Akwasi M Sarpong
(74) *Attorney, Agent, or Firm* — Staas & Halsey LLP

(57) ABSTRACT

An image forming apparatus includes an image forming unit, a power supply configured to receive and convert an alternating current (AC) voltage into at least one direct current (DC) voltage, and output the same, a DC-DC converter configured to convert the at least one DC voltage into a driving voltage at a predetermined level, and a controller configured to be activated by the driving voltage, and control the power supply to turn on the image forming unit by supplying a first DC voltage to the image forming unit, and after the image forming unit has been turned on, supplying a second DC voltage at a higher level than a level of the first DC voltage to the image forming unit.

10 Claims, 9 Drawing Sheets

(56) References Cited

U.S. PATENT DOCUMENTS

| | | | | |
|---|---|---|---|---|
| 7,443,704 B2* | 10/2008 | Oh | ................... | H02M 7/53803 324/107 |
| 8,736,861 B2* | 5/2014 | Sato | ................... | G03G 15/80 323/285 |
| 8,760,130 B2* | 6/2014 | Yamaguchi | ............. | H03K 17/60 323/265 |
| 2002/0126113 A1* | 9/2002 | Iwasaki | ................... | G09G 3/36 345/211 |
| 2003/0072023 A1* | 4/2003 | Tanaka | ................... | 358/1.13 |
| 2004/0139052 A1* | 7/2004 | Kazushige et al. | ................ | 707/1 |
| 2007/0014131 A1* | 1/2007 | Oh | ................... | H02M 7/53803 363/21.05 |
| 2007/0098433 A1* | 5/2007 | Yano | ................... | G03G 15/80 399/88 |
| 2008/0091065 A1* | 4/2008 | Oshima et al. | ................ | 600/109 |
| 2008/0253787 A1 | 10/2008 | Yoda | | |
| 2010/0231945 A1* | 9/2010 | Tanaka | ................... | 358/1.13 |
| 2010/0277754 A1* | 11/2010 | Arimura et al. | ................ | 358/1.9 |
| 2011/0187440 A1* | 8/2011 | Yamaguchi | ............. | H03K 17/60 327/482 |
| 2011/0280597 A1* | 11/2011 | Shimura | ................ | G01R 19/165 399/37 |
| 2011/0296218 A1* | 12/2011 | Kim | ................... | H02J 3/32 713/323 |

* cited by examiner

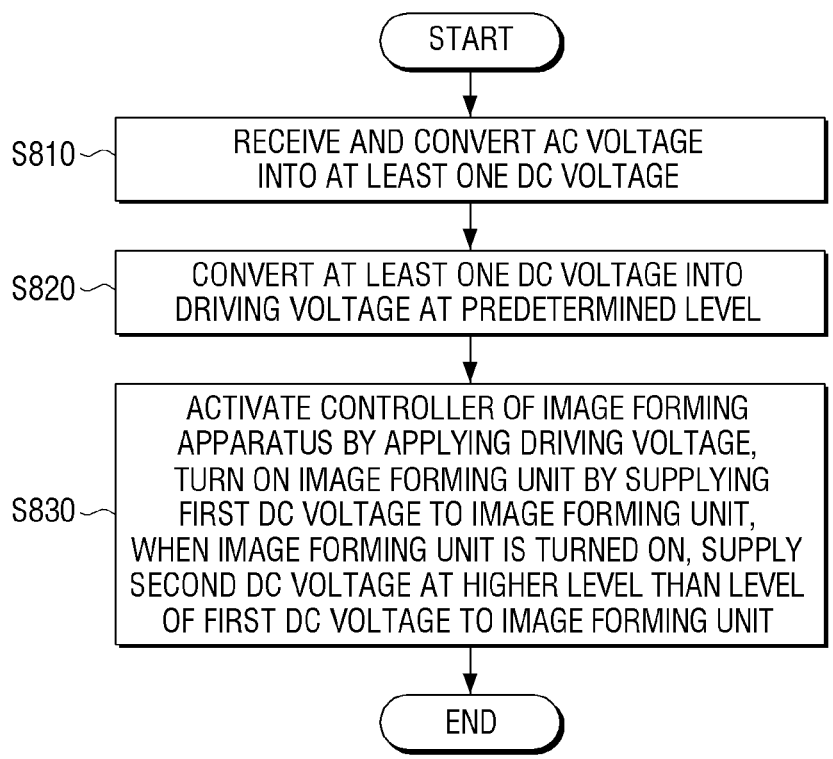

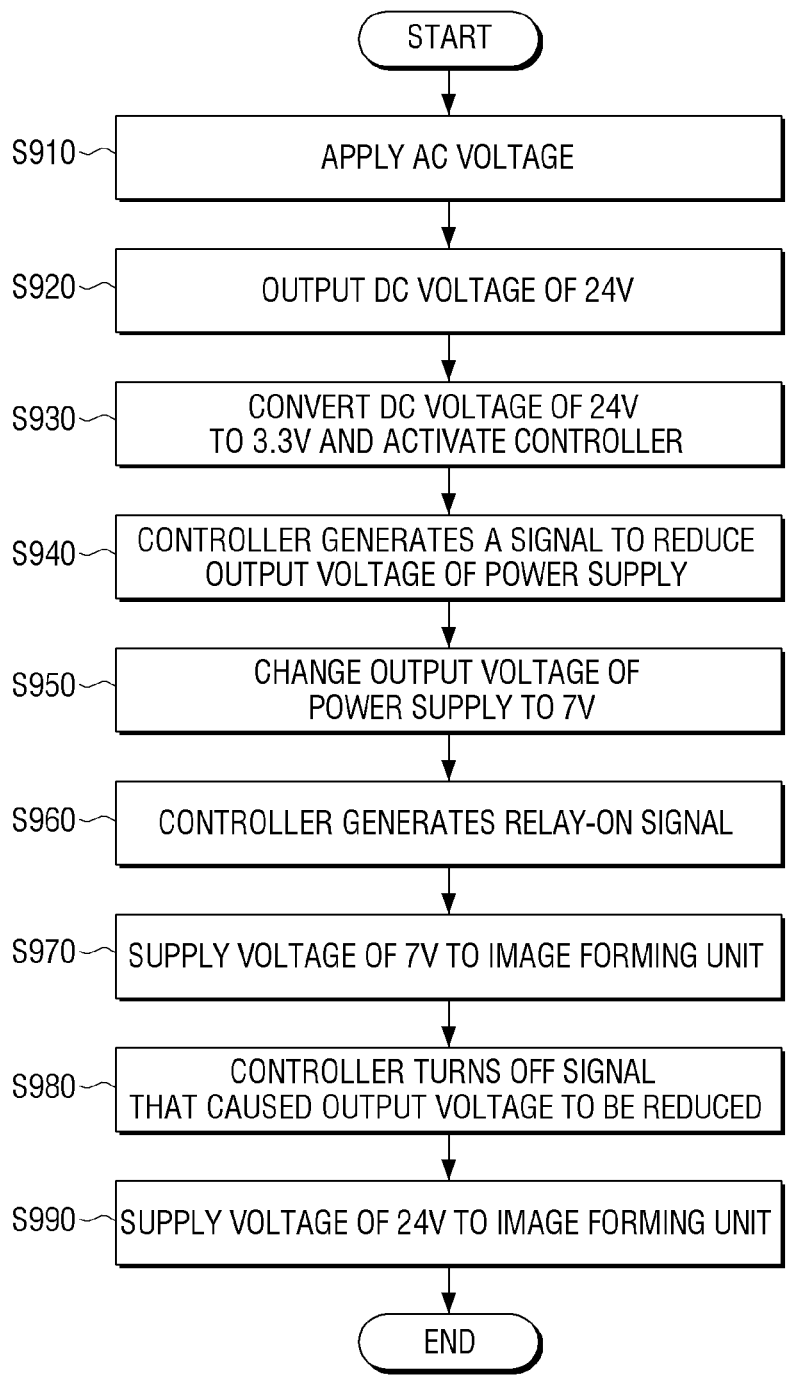

IMAGE FORMING APPARATUS AND METHOD OF SUPPLYING POWER THEREOF

CROSS-REFERENCE TO RELATED APPLICATIONS

This application claims the benefit of priority under 35 U.S.C. §119 to Korean Patent Application No. 10-2013-0077918, filed on Jul. 3, 2013, in the Korean Intellectual Property Office, the content of which is incorporated herein in its entirety by reference.

BACKGROUND OF THE INVENTION

1. Field of the Invention

The present general inventive concept generally relates to an image forming apparatus and a method of supplying power thereof, and more particularly, to an image forming apparatus for preventing an occurrence of an inrush current by a sudden voltage fluctuation which occurs as an open circuit is changed to a short circuit when a mode of the image forming apparatus is changed from a power saving mode to an activation mode, or a state of the image forming apparatus is changed from a turned-off state to a turned-on state, and a method of supplying power thereof.

2. Description of the Related Art

As a part of efforts for environment protection, efforts to reduce energy consumed by electronic devices are proceeding globally. In particular, regulation of electricity consumption of electronic devices in standby mode is being enforced.

For example, an electronic product to be released in a domestic market of the United States, Europe, and Korea should satisfy power the consumption standard of each country (i.e., the Environmental Protection Agency (EPA) Energy Star Product Specification for Imaging Equipment Version 1.2 in the United States, State 2 of the European Commission Ecodesign Directive for Energy-related Products (ErP), and a level below 0.1 W as stated by the Public Procurement Service in Korea).

In order to satisfy the regulations for standby power consumption, technical development to reduce power consumption when an electronic product enters into a standby mode is proceeding. Developments include a method of improving efficiency when a switching mode power supply (SMPS) has a light load, a method of reducing a load of a controller in standby mode, a method of opening a channel connected to a unused load, and the like.

Among the aforementioned methods, a power saving mode refers to a mode where an unused load channel is opened, and minimum power to operate an electronic device is supplied.

With reference to an image forming apparatus as an example, when the image forming apparatus is not used for a predetermined time, the image forming apparatus enters into a power saving mode, and in the power saving mode, minimum power is supplied to a controller configured to determine whether a command from a user has been inputted from outside, and no power is supplied to machines configured to perform operations such as printing, scanning, copying, and the like.

Subsequently, when the mode of the image forming apparatus is changed from the power saving mode to an activation mode, an open state of a load side circuit is changed to a short state, and a large amount of inrush current occurs because of a sudden voltage fluctuation.

To be specific, current (i) may be expressed as a derivative of voltage (V) with respect to time (t) (dV/dt), and thus when a sharp voltage fluctuation occurs in a short period of time, it causes a large amount of inrush current. The inrush current lowers stability of a system by causing stress on circuit components and affecting an output voltage drop of the SMPS.

The aforementioned problems occur not only when the mode of the image forming apparatus is changed from the power saving mode to the activation mode, but also when the state of the image forming apparatus is changed from a turned-off state to a turned-on state.

Hence, there is a need for an image forming apparatus configured to reduce an inrush current of a direct current (DC) output unit and a method of supplying power thereof.

SUMMARY OF THE INVENTION

The present inventive concept provides an image forming apparatus and a method of supplying power thereof. Exemplary embodiments of the present inventive concept provide an image forming apparatus configured to minimize an inrush current which may occur when a mode of the image forming apparatus is changed from a power saving mode to an activation mode, or when a state of the image forming apparatus is changed from a turned-off state to a turned-on state, and a method of supplying power thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus that includes an image forming unit, a power supply configured to receive and convert an alternating current (AC) voltage into at least one direct current (DC) voltage, and output the same, a DC-DC converter configured to convert the at least one DC voltage into a driving voltage at a predetermined level, and a controller configured to be activated by the driving voltage, and control the power supply to turn on the image forming unit by supplying a first DC voltage to the image forming unit, and after the image forming unit has been turned on, supplying a second DC voltage at a higher level than a level of the first DC voltage to the image forming unit.

The power supply may include a converter configured to receive and convert the AC voltage into the at least one DC voltage, and a voltage regulator configured to convert the at least one DC voltage into the first DC voltage or the second DC voltage.

The converter may include a first converter configured to convert the AC voltage into the first DC voltage, and a second converter configured to convert the AC voltage into the second DC voltage, and may further include a switcher configured to selectively output the first DC voltage and the second DC voltage to the image forming unit selectively under a control of the controller.

The controller may be configured to control the power supply to supply the second DC voltage after the image forming unit has been turned on and a potential difference between both ends of a capacitor connected in parallel with the image forming unit has become equal to a predetermined voltage level.

The controller may be configured to control the power supply to supply the second DC voltage after the image forming unit has been turned on and a predetermined time has elapsed.

The image forming apparatus may further include a switcher configured to electrically connect the power supply to the image forming unit or disconnect the power supply from the image forming unit. In addition, the controller may be configured to control the switcher so that the power supply and the image forming unit are connected in response to the first DC voltage being outputted from the power supply.

In response to a mode of the image forming apparatus being changed to a power saving mode, the controller may turn off the image forming unit, and in response to the mode of the image forming apparatus being changed to an activation mode, the controller may control the power supply to turn on the image forming unit by supplying the first DC voltage to the image forming unit, and after the image forming unit has been turned on, supplying the second DC voltage to the image forming unit.

The foregoing and/or other features and utilities of the present invention also provide a method of supplying power of an image forming apparatus that includes receiving and converting an alternating current (AC) voltage into at least one direct current (DC) voltage, converting one of the at least one DC voltage into a driving voltage at a predetermined level, activating a controller of the image forming apparatus by using the driving voltage, turning on the image forming unit of the image forming apparatus by supplying a first DC voltage to the image forming unit, and after the image forming unit has been turned on, supplying a second DC voltage at a higher level than a level of the first DC voltage to the image forming unit.

The method may further include converting the at least one DC voltage into the first DC voltage or the second DC voltage.

The method may further include outputting either of the first DC voltage or the second DC voltage to the image forming unit selectively, wherein the receiving and converting the AC voltage into the at least one DC voltage includes receiving and converting the AC voltage into the first DC voltage and the second DC voltage.

The supplying the second DC voltage at a higher level than the level of the first DC voltage to the image forming unit may include measuring a potential difference between both ends of a capacitor, connected in parallel with the image forming unit, after the image forming unit has been turned on, and supplying the second DC voltage to the image forming unit in response to the potential difference between both ends of the capacitor having become equal to a predetermined voltage level.

The supplying the second DC voltage at the higher level than the level of the first DC voltage to the image forming unit may include supplying the second DC voltage to the image forming unit after the image forming unit has been turned on and a predetermined time has elapsed.

The method may further include controlling a switcher of the image forming apparatus to electrically connect or disconnect the image forming unit in response to the first DC voltage being outputted from the image forming apparatus.

The method may further include turning off the image forming unit in response to a mode being changed to a power saving mode, and in response to the mode being changed to an activation mode, turning on the image forming unit by supplying the first DC voltage to the image forming unit, and after the image forming unit has been turned on, supplying the second DC voltage to the image forming unit.

The foregoing and/or other features and utilities of the present inventive concept also provide a non-transitory computer readable recording medium that includes a program to execute a method of supplying power of an image forming apparatus on a computer in which the method may include receiving and converting an alternating current (AC) voltage into at least one direct current (DC) voltage, converting one of the at least one DC voltage into a driving voltage at a predetermined level, activating a controller of the image forming apparatus by using the driving voltage, turning on the image forming unit of the image forming apparatus by supplying a first DC voltage to the image forming unit, and after the image forming unit has been turned on, supplying a second DC voltage at a higher level than a level of the first DC voltage to the image forming unit.

The receiving and converting an AC voltage into the at least one DC voltage may include converting the at least one DC voltage into the first DC voltage or the second DC voltage.

The method may further include outputting either of the first DC voltage or the second DC voltage to the image forming unit selectively, wherein the receiving and converting the AC voltage into the at least one DC voltage includes receiving and converting the AC voltage into the first DC voltage and the second DC voltage. The supplying the second DC voltage at a higher level than the level of the first DC voltage to the image forming unit may include measuring a potential difference between both ends of a capacitor, connected in parallel with the image forming unit, after the image forming unit has been turned on, and supplying the second DC voltage to the image forming unit in response to the potential difference between both ends of the capacitor having become equal to a predetermined voltage level. The supplying the second DC voltage at the higher level than the level of the first DC voltage to the image forming unit may include supplying the second DC voltage to the image forming unit after the image forming unit has been turned on and a predetermined time has elapsed. The method may further include controlling a switcher of the image forming apparatus to electrically connect or disconnect the image forming unit in response to the first DC voltage being outputted from the image forming apparatus. The method may further include turning off the image forming unit in response to a mode being changed to a power saving mode, and in response to the mode being changed to an activation mode, turning on the image forming unit by supplying the first DC voltage to the image forming unit, and after the image forming unit has been turned on, supplying the second DC voltage to the image forming unit.

The foregoing and/or other features and utilities of the present inventive concept also provide a method of providing an electric power to a component of an apparatus that includes providing, under a control of a controller, a first level voltage to the component and to a capacitor connected in parallel with the apparatus, receiving, at the controller, a signal indicating a measure of a voltage potential across the capacitor, and changing, under the control of the controller, in response to the signal indicating that the measure of the voltage potential has become equal to a predetermined level, the first level voltage to a second level voltage.

The method may further include blocking, under the control of the controller, in response to a mode of the apparatus changing to a power saving mode, the second level voltage from the component.

The method may further include repeating, in response to the mode of the apparatus changing from the power saving mode to an activation mode, the providing, the receiving, and the changing.

The method may further include delaying, under the control of the controller, a connection between a power supply and the component until the power supply provides the first level voltage.

The foregoing and/or other features and utilities of the present inventive concept also provide a non-transitory computer-readable recording medium containing instructions which, when executed by a controller, cause the controller to perform a method of providing electric power to a component of an apparatus in which the method includes providing, under a control of a controller, a first level voltage to the component and to a capacitor connected in parallel with the apparatus, receiving, at the controller, a signal indicating a measure of a voltage potential across the capacitor, and changing, under the control of the controller, in response to the signal indicating that the measure of the voltage potential has become equal to a predetermined level, the first level voltage to a second level voltage.

The foregoing and/or other features and utilities of the present inventive concept also provide a power supply system that includes a capacitor configured to be connected in parallel with an apparatus configured to receive an electric power, and a power supply configured to provide the electric power to the apparatus at a first level voltage initially and, in response to a measure of a voltage potential across the capacitor having become equal to a predetermined level, to provide the electric power to the apparatus at a second level voltage.

As explained above, if power at a low voltage is applied to an image forming unit of an image forming apparatus in response to a mode of the image forming apparatus being changed from a power saving mode to an activation mode or in response to a state of the image forming apparatus being changed from a turned-off state to a turned-on state, it may be possible to reduce an inrush current and thereby stabilize a system associated with a power supply and reduce stress of surrounding circuit components.

BRIEF DESCRIPTION OF THE DRAWINGS

The above and/or other features and utilities of the present general inventive concept will become apparent and more readily appreciated from the following description of the embodiments, taken in conjunction with the accompanying drawings of which:

FIG. 8 is a flow chart illustrating a method of supplying power of the image forming apparatus according to an embodiment of the present inventive concept; and FIG. 9 is a flow chart illustrating a method of supplying power in response to the state of the image forming apparatus being changed from a turned-off state to a turned-on state according to an embodiment of the present inventive concept.

DETAILED DESCRIPTION OF THE EMBODIMENTS

Figure 1:
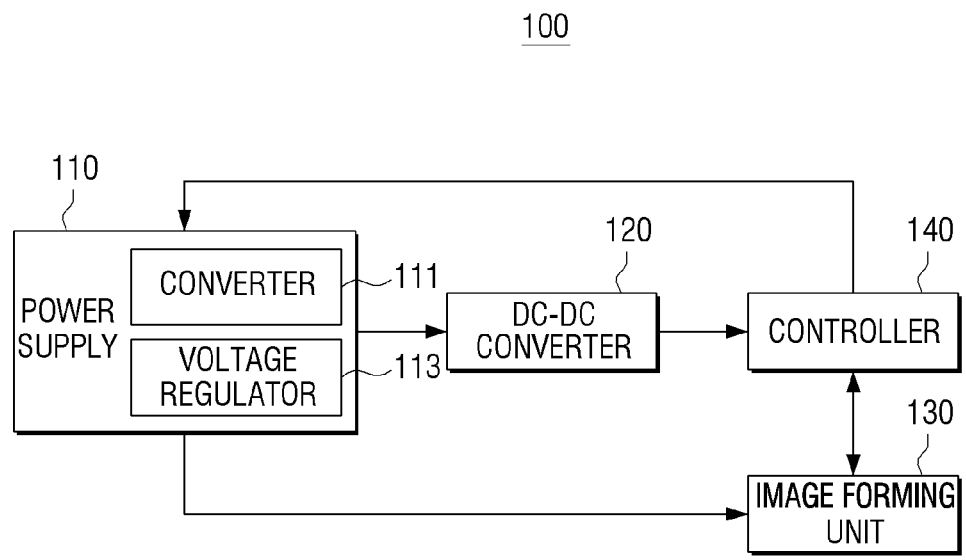
FIG. 1 is a block diagram illustrating an image forming apparatus 100 according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram that illustrates an image forming apparatus 100 according to an embodiment of the present inventive concept.

According to FIG. 1, the image forming apparatus 100 may include a power supply 110, a converter 111, a voltage regulator 113, a DC-DC converter 120, an image forming unit 130, and a controller 140.

FIG. 1 illustrates components of the image forming apparatus 100 related to an embodiment of the present inventive concept. Other general components may also be included in the image forming apparatus 100 in addition to the components illustrated in FIG. 1, as known by a person of ordinary skill in the art.

The power supply 110 may receive and convert an AC voltage into at least one or more DC voltages, and may output the same. The power supply 110 may be, for example, a switching mode power supply (SMPS) for an image forming apparatus, but the present inventive concept is not limited thereto.

The power supply 110 may include the converter 111, configured to receive and convert an AC voltage into a DC voltage, and the voltage regulator 113, configured to convert the converted DC voltage into at least one of a first DC voltage and a second DC voltage.

Figure 2:
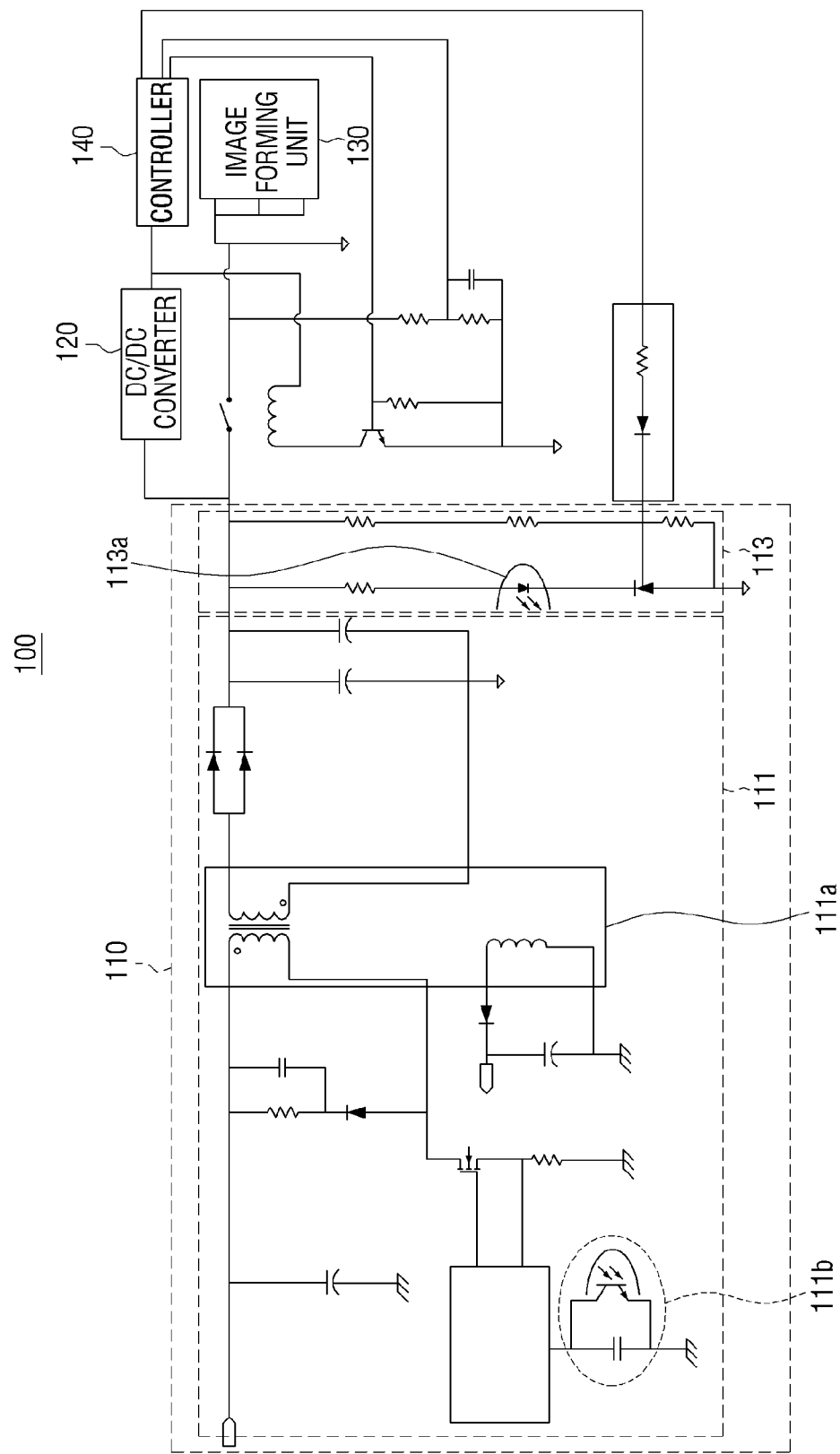
FIG. 2 is a circuit diagram illustrating the image forming apparatus according to an embodiment of the present inventive concept.

The converter 111 may convert an AC voltage, which may be inputted to the power supply 110, into at least one or more DC voltages by using at least one or more transformers (see FIG. 2). That is, the converter 111 may rectify the AC voltage, and the rectified voltage may be switched, may be passed through a transformer (see FIG. 2), and may be converted into at least one or more DC voltages.

For example, the converter 111 may further include a rectifier element (not illustrated), which may rectify an AC voltage, and a smoothing element (not illustrated), which may smooth the rectified voltage, in order to rectify the AC voltage. In an embodiment of the present inventive concept, the rectifier element may employ a bridge circuit (not illustrated) that uses a diode, and the smoothing element may use a capacitor (not illustrated), but the present inventive concept is not limited thereto.

For example, the converter 111 may further include a switching controller (not illustrated) configured to control switching to apply the rectified voltage to a transformer (see FIG. 2). The switching controller, according to an embodiment of the present inventive concept, may be, for example, a Pulse-Width Modulation (PWM) Integrated Circuit (IC), but the present inventive concept is not limited thereto.

The voltage regulator 113 may convert the converted DC voltage into at least one of the first DC voltage and the second DC voltage.

For example, the voltage regulator 113 may regulate an amount of voltage that may be transmitted to a photo coupler (see FIG. 2) according to a level of an output voltage of a secondary coil of a transformer (see FIG. 2) of the converter 111. For example, a light emitter (see FIG. 2) of the photo coupler may be located on the secondary coil of the transformer and may be connected to the voltage regulator 113 in series, and a light receiver (see FIG. 2) of the photo coupler may control switching of a voltage of a primary coil through a connection to the switching controller (not illustrated) which may be located on the primary coil of the transformer. Accordingly, the voltage regulator 113 may regulate a voltage level of the output voltage to be in a certain range by regulating an amount of current which may be fed back to the primary coil of the transformer through the photo coupler (see FIG. 2) based on the voltage level of the output voltage.

The DC-DC converter 120 may convert a DC voltage into a driving voltage at a predetermined level.

With reference to the image forming apparatus 100 as an example, a voltage level of an output unit of the power supply 110 may be 24V, while a level of a driving voltage of a central processing unit (CPU) (not illustrated) may be 3.3V, and a level of a driving voltage of each machine that may perform at least one of a printing, a facsimile, a scanning, and a copying operations may be 24V.

Accordingly, in order to operate the CPU with a voltage outputted from the power supply 110, the output voltage of the power supply 110 should be converted to a CPU driving voltage, and the DC-DC converter 120 may perform such a function.

The image forming unit 130 may perform an image forming job.

The image forming job may include operations such as, for example, scanning, copying, printing, sending and receiving a facsimile, and the like. For example, the image forming unit 130 may include at least one or both of a scanner module (not illustrated) and a printer module (not illustrated) according to a type of the image forming apparatus 100.

In response to a mode of the image forming apparatus 100 being changed to a power saving mode, a voltage, which may have been supplied to the image forming unit 130, may be blocked in order to minimize standby power to be applied to the image forming unit 130.

Subsequently, in response to the mode of the image forming apparatus 100 being changed from the power saving mode to an activation mode according to an external command, a voltage may be supplied to the image forming unit 130. The function of supplying the voltage to the image forming unit 130 or blocking the voltage from the image forming unit 130 may be performed, for example, by a relay circuit (not illustrated), a field effect transistor (FET) blocking circuit (not illustrated), or a mechanical switch (not illustrated) which may be controlled by a user.

The controller 140 may be activated by the driving voltage that was converted by the DC-DC converter 120, and may control the power supply 110 to turn on the image forming unit 130 by supplying the first DC voltage to the image forming unit 130, and in response to the image forming unit 130 being turned on, may supply the second DC voltage, at a higher level than a level of the first DC voltage, to the image forming unit 130.

For example, in the power saving mode, a voltage which may have been supplied to the image forming unit 130 may be blocked, and the voltage may only be supplied to the controller 140 in order to perform minimum operations.

For example, in the power saving mode, a voltage of 24V, which may be outputted from the power supply 110, may be converted into 3.3V that may be a driving voltage of the controller 140 and may be supplied to the controller 140, A relay circuit (not illustrated), which may connect the image forming unit 130 and the power supply 110, may be opened, and thus no voltage may be supplied to the image forming unit 130.

For example, in response to a command that instructs initiation of an activation mode being received from outside, the controller 140 may control the voltage regulator 113 to reduce the output voltage of the power supply 110 to the first DC voltage. Although in an explanation below, a level of the first DC voltage that may be lowered by a control signal of the controller 140 and may be outputted from the power supply 110 may be 7V, in implementation the level of the first DC voltage may be set arbitrarily and the present inventive concept is not limited thereto.

In response to the output voltage of the power supply 110 being the first DC voltage, the controller 140 may control the switcher (not illustrated) that may connect the power supply 110 and the image forming unit 130 or may disconnect the power supply 110 from the image forming unit 130 electrically to turn off the image forming unit 130.

Subsequently, in response to the image forming unit 130 being turned on by the first DC voltage, the controller 140 may control the voltage regulator 113 so that the output voltage of the power supply 110 may be changed to the second DC voltage at a higher level than a level of the first DC voltage, and may supply the second DC voltage to the image forming unit 130.

As explained above, in an embodiment of the present inventive concept, the second DC voltage may be supplied to the image forming unit 130 after the image forming unit 130 is turned off by using the first DC voltage since the first DC voltage (e.g., 7V in an embodiment of the present inventive concept) may turn on the image forming unit 130, but may not supply power at a sufficient level to operate the image forming unit 130.

Thus, after the image forming unit 130 is turned off, the output voltage of the power supply 110 may be controlled to be the second DC voltage at a higher level than a level of the first DC voltage, and may be supplied to the image forming unit 130.

That is, a reduction of an inrush current caused by a voltage fluctuation may be achieved by turning on the image forming unit 130 by supplying the relatively low first DC voltage to the image forming unit 130.

For example, a current (i) may be expressed as a derivative of voltage (V) with respect to time (t) (dV/dt), and thus an amount of an inrush current due to a sudden voltage fluctuation may be reduced as a variation of a voltage (dV) is reduced.

FIG. 2 is a circuit diagram illustrating the image forming apparatus 100 according to an embodiment of the present inventive concept.

As explained above with respect to FIG. 1, the image forming apparatus 100, according to an embodiment of the present inventive concept, may include the power supply 100, the converter 111, the voltage regulator 113, the DC-DC converter 120, the image forming unit 130, and the controller 140.

As illustrated in FIG. 2, the converter 111 of the power supply 110 may include a transformer 111a. The embodiment of the present inventive concept illustrated in FIG. 2 includes only one transformer 111a in the converter 111, but in implementation of other embodiments, one or more transformers 111a may be included.

The transformer 111a may transmit electrical energy from a first circuit to a second circuit by an induction action of a coil. Accordingly, the transformer 111a may transmit the electrical energy applied to the primary coil to the secondary coil.

According to an embodiment of the present inventive concept, the transformer 111a may convert a voltage of the primary coil into a voltage of the secondary coil based on a ratio of a number of windings of the primary coil to the number of windings of the secondary coil. Hence, the power supply 110 may supply a voltage required to operate the image forming unit 130 and the controller 140 by using the voltage of the secondary coil, which may be converted by the transformer 111a.

The voltage regulator 130 may regulate a voltage level of a DC voltage which may be outputted from the transformer 111a of the converter 111. Hence, the output voltage of the power supply 110 may be regulated from the first DC voltage or the second DC voltage.

For example, in response to the controller 140 transmitting a control signal so that the output voltage of the power supply 110 may be outputted as the first DC voltage, an amount of current which may be transmitted to a light emitter of a photo coupler 113a of the voltage regulator 113 may be regulated.

In response to the amount of current which is transmitted to the photo coupler 113a changing, the light emitter of the photo coupler 113a may emit light, and a light receiver of the photo coupler 111b of the converter 111 may receive the emitted light and may regulate a voltage which may be applied to the transformer 111a.

Hence, the output voltage, which may be outputted from the power supply 110, may be changed to the first DC voltage or the second DC voltage.

In response to the first DC voltage being applied by regulating the voltage outputted from the power supply 110, the controller 140 may connect the power supply 110 and the image forming unit 140 electrically, and in response to the image forming unit 130 being turned on by the first DC voltage, the controller may operate the image forming unit 130 by changing the output voltage of the power supply 110 to the second DC voltage. This operation has been explained with reference to FIG. 1, and thus a detailed description of the operation is omitted.

Figure 3:
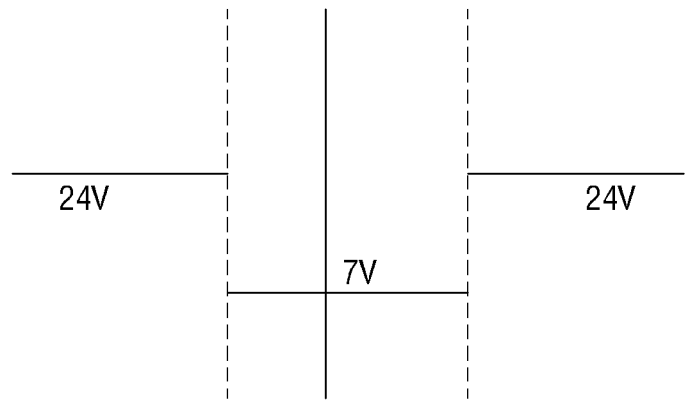
FIG. 3 is a diagram illustrating a point of time when the image forming unit is turned on according to an embodiment of the present inventive concept.

FIG. 3 is a diagram illustrating a point of time when the image forming unit 130 is turned on according to an embodiment of the present inventive concept.

Although in an explanation below, a level of the first DC voltage may be 7V, and a level of the second DC voltage may be 24V, in implementation the level of the first DC voltage and the second DC voltage may vary and the present inventive concept is not limited thereto.

For example, the power supply 110 may supply power necessary for the image forming apparatus 100 by receiving an AC voltage from outside and may output the voltage as a DC voltage at 24V.

In the power saving mode, no power may be supplied to the image forming unit 130 because the image forming unit 130 may be disconnected from the power supply 110, and a DC voltage of 24V may be converted into 3.3V by the DC-DC converter 120 and may be supplied to the controller 140.

For example, in response to a command that instructs changing from the power saving mode to the activation mode being received from outside, the controller 140 may control the voltage regulator 113 of the power supply 110 to reduce the output voltage of the power supply 110 to 7V.

For example, in response to an increase in an amount of current which passes through light emitter of the photo coupler 113a of the voltage regulator 113, the light emitter of the photo coupler 113a may emit light, and the light receiver of the photo coupler 111b of the converter 111 may receive the emitted light and may regulate the level of voltage which may be supplied to the primary coil of the transformer 111a.

Hence, in response to a level of the output voltage of the power supply 110 being reduced to 7V, the controller 140 may connect the power supply 110 and the image forming unit 130 electrically.

In response to the voltage of 7V being supplied to the image forming unit 130 and the image forming unit 130 being turned on, the controller 140 may control the voltage regulator 113 so that the output voltage of the power supply 110 may be changed to 24V since the voltage of 7V may not supply sufficient power to operate the image forming unit 130.

That is, a reduction of an inrush current caused by a voltage fluctuation may be achieved by turning on the image forming unit 130 when the output voltage of the power supply 110 may be 7V, which may be relatively lower than a normal voltage.

A process of elevating a level of the output voltage of the power supply 110 from 7V to 24V may be implemented variously.

Figure 4:
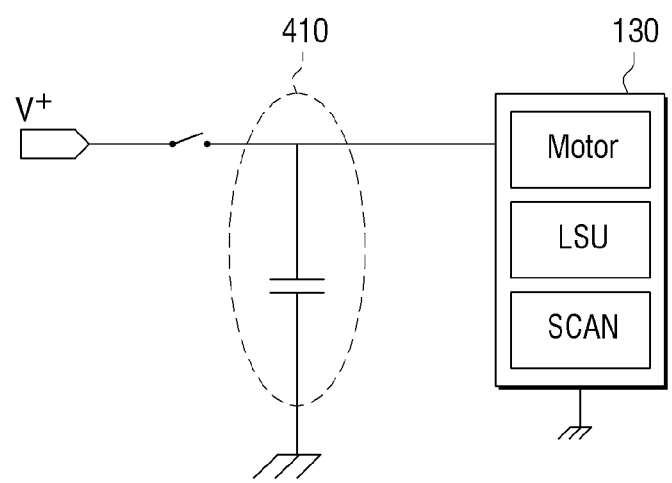
FIG. 4 is a schematic diagram illustrating a method of converting a voltage applied to the image forming unit from the a DC voltage to a second DC voltage.

FIG. 4 is a schematic diagram illustrating a method of converting a voltage applied to the image forming unit 130 from the first DC voltage to the second DC voltage.

As illustrated in FIG. 4, the image forming unit 130 may include a motor to operate various machines, a laser scan unit, and a scan module. In addition, the image forming unit 130 may include various modules, not illustrated in FIG. 4, to perform copying, printing, and facsimile operations.

A capacitor 410 may be connected in parallel with the image forming unit 130 in order to stably supply power to the image forming unit 130.

In response to the first DC voltage being supplied to the image forming unit 130 and the image forming unit 130 being turned on, the capacitor 410 may be gradually charged.

The controller 140 may measure the voltages at both ends of the capacitor 410, and in response to the voltages reaching a predetermined voltage, the controller 140 may control the voltage regulator 113 so that the output voltage of the power supply 110 may be changed to the second DC voltage.

Alternatively, rather than regulate the output voltage of the power supply 110 according to a result of measurements of both ends of the capacitor 410, the controller 140, in response to a predetermined time being elapsed after the image forming unit 130 is turned on by the first DC voltage, may control the power supply 110 to output the second DC voltage.

Although the explanation of the present inventive concept thus far has been for an embodiment in which the power supply 110 may have an output terminal, and a voltage of the output terminal may be changed to the first DC voltage or the second DC voltage, the present inventive concept is not limited thereto and the power supply 110 may be implemented to output one or more voltages simultaneously.

Figure 5:
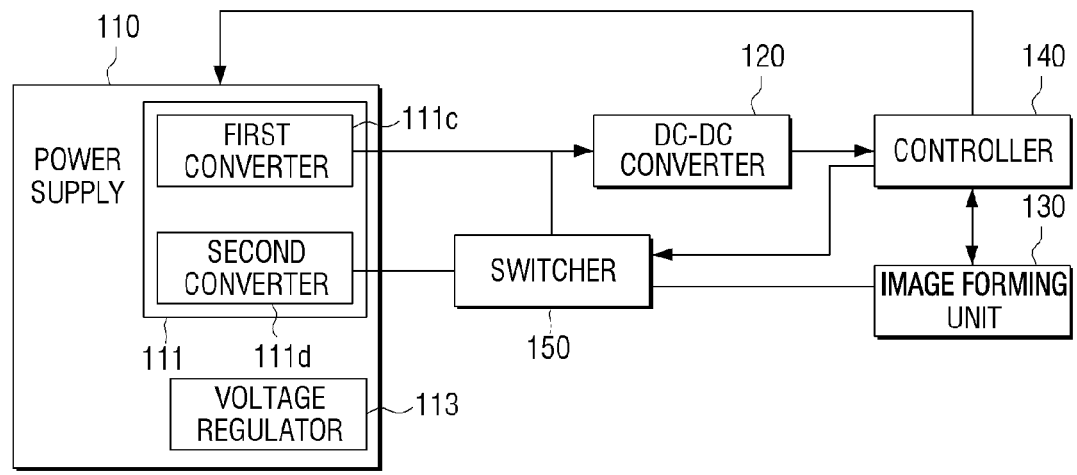
FIG. 5 is a block diagram for illustrating the image forming apparatus that includes a multiple output voltage supply according to an embodiment of the present inventive concept.

FIG. 5 is a block diagram for illustrating the image forming apparatus 100 that includes a multiple output voltage supply 110 according to an embodiment of the present inventive concept.

The image forming apparatus 100 illustrated in FIG. 5 includes the power supply 110, the DC-DC converter 120, the image forming unit 130, the controller 140, and the switcher 150.

The operations of the power supply 110, the DC-DC converter 120, the image forming unit 130, and the controller of FIG. 5 are the same as explained above, and thus overlapped repeated description of their operations is omitted.

In an implementation of the power supply 110 to output multiple voltages, a transformer (not illustrated) may convert a voltage of the primary coil to one or more voltages of the secondary coil, and may output the one or more voltages by adjusting a winding shape of a coil of the transformer. Alternatively, one or more transformers may convert the same voltage of the primary coil to a voltage of the secondary coil according the number of windings of each transformer.

That is, the power supply 110 may include a first converter 111c configured to output the first DC voltage and a second converter 111d configured to output the second DC voltage at a higher level than the first DC voltage.

For example, in response to the image forming apparatus 100 being in the power saving mode, the controller 140 may control the switcher 150 to supply the first DC voltage outputted from the first converter 111c to the controller 140.

For example, in response to a command that instructs a change from the power saving mode to the activation mode being received from outside, the controller 140 may control the switcher 150 to connect the power supply 110 and the image forming unit 130 electrically so that the first DC voltage of the first converter 111c may be supplied to the image forming unit 130, and in response to the image forming unit 130 being turned on by the first DC voltage, the controller 140 may control the switcher 150 to supply the second DC voltage to operate the image forming unit 130.

That is, as the controller 140 controls the switcher 150 to supply the first DC voltage in response to the image forming unit 130 being turned on, and to supply the second DC voltage required to operate the image forming unit after the image forming unit 130 has been turned on, the inrush current, which may occur when the mode of the image forming apparatus 100 is changed from the power saving mode to the activation mode, may be reduced.

Figure 6:
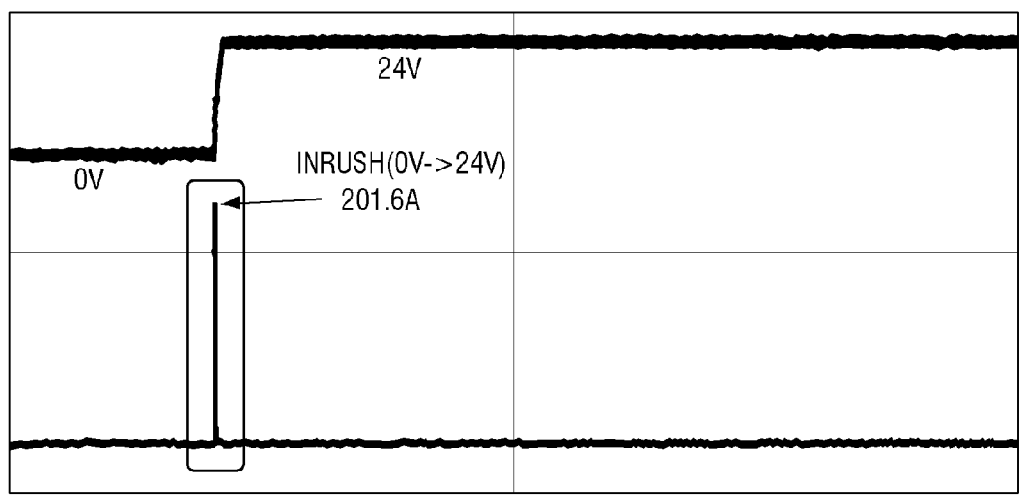
FIGS. 6 and 7 are graphs that illustrate an amount of inrush current that occurs when the image forming unit is turned on according to, respectively, a conventional embodiment and an embodiment of the present inventive concept.
Figure 7:
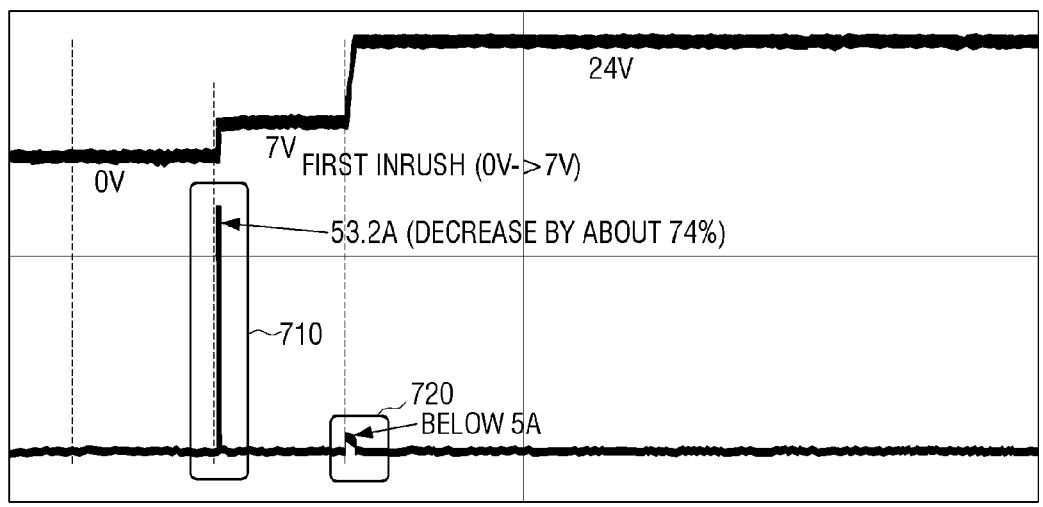

FIGS. 6 and 7 are graphs that illustrate an amount of inrush current that occurs when the image forming unit 130 is turned on according to, respectively, a conventional embodiment and an embodiment of the present inventive concept.

FIG. 6 is a graph that illustrates a measurement result of the amount of inrush current that occurs when power required to operate the image forming unit 130 is directly supplied, rather than gradually applying a voltage according to the present inventive concept.

As illustrated in FIG. 6, in response to a DC voltage being directly applied to the image forming unit 130, an inrush current of 201.6 A may occur.

In contrast, as illustrated in FIG. 7, in response to the first DC voltage being supplied gradually to turn on the image forming unit 130, and a voltage required to operate the image forming unit 130 being supplied according to the present inventive concept, the amount of the inrush current may be reduced.

FIG. 7 illustrates an experiment of an embodiment of the present inventive concept performed based on a condition in which a level of the first DC voltage is 7V, and a level of the second DC voltage is 24V, but the present inventive concept is not limited thereto and the level of the first DC voltage and the second DC voltage may be set arbitrarily. However, the level of the first DC voltage should be lower than the level of the second DC voltage.

For example, in response to the image forming unit 130 being turned on by applying the first DC voltage, an inrush current of 53.2 A may occur. That is, the amount of the inrush current decreases by 74% as compared with the level of the inrush current that occurs in response to the image forming unit 130 being turned on immediately. In response to the second DC voltage being applied, an inrush current of 5 A may occur.

FIG. 8 is a flow chart illustrating a method of supplying power of the image forming apparatus 100 according to an embodiment of the present inventive concept.

In response to an AC voltage being inputted from outside, the inputted AC voltage may be converted into one or more DC voltages (S810). The converted DC voltage may be converted into a voltage to operate the controller 140 (S820) and may be applied to the controller 140. The controller 140 may turn on the image forming unit 130 by supplying the first DC voltage, and in response to the image forming unit 130 being turned on, the controller 140 may supply the second DC voltage, at a higher level than a level of the first DC voltage, to the image forming unit 130 (S830).

FIG. 9 is a flow chart illustrating a method of supplying power in response to the state of the image forming apparatus 100 being changed from a turned-off state to a turned-on state according to an embodiment of the present inventive concept.

In response to an AC voltage being applied from outside (S910), the AC voltage may be converted into a DC voltage of 24V and outputted (S920). Because the converted DC voltage of 24V may not be suitable to activate the controller 140, the DC voltage of 24V may be converted into a DC voltage of 3.3V and may be supplied to the controller 140 (S930).

The activated controller 140 may generate a control signal to reduce the output voltage of the power supply 110 (S940), and in response to a level of the output voltage of the power supply 110 being changed to 7V by the control signal (S950), the controller 140 may generate a relay-on signal to connect the power supply 110 and the image forming unit 130 electrically (S960).

In response to the image forming unit 130 being turned on by the reduced output voltage of 7V (S970), the controller 140 may turn off a signal that caused the output voltage to be reduced in order to increases the output voltage again (S980), and in response to the level of the output voltage being elevated to 24V, the controller may supply the output voltage to the image forming unit 130 (S990).

The methods explained above may be implemented in a program which may be executable on a computer, and may be implemented on a universal digital computer which may operate the program by using a computer readable recording medium. In addition, a configuration of data used in the methods explained above may be recorded on a computer readable recording medium by various means. The computer readable recording medium may include a magnetic recording medium (e.g., a read only memory (ROM), a floppy disk, a hard disk, and the like) and an optical reader (e.g., a compact disc read-only memory (CD-ROM), a digital video disk (DVD), and the like).

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   an image forming unit;
   a power supply configured to receive an alternating current (AC) voltage and including a transformer that converts the received AC voltage into at least one direct current (DC) voltage, and output the same;
   a DC-DC converter configured to receive the outputted at least one DC voltage from the power supply including a transformer that converts the received DC voltage of a first level into a DC driving voltage at a predetermined second level that is different than the second level and output the converted DC voltage; and
   a controller that is configured to be activated by a DC driving voltage of a certain level, to receive the DC driving voltage output from the DC-DC converter, and control the power supply to turn on the image forming unit by supplying a first DC voltage to the image forming unit, and after the image forming unit has been turned on, supplying a second DC voltage at a higher level than a level of the first DC voltage to the image forming unit,
   wherein in response to a mode of the image forming apparatus being changed to a power saving mode, the controller turns off the image forming unit, and in response to the mode of the image forming apparatus being changed to an activation mode, the controller controls the power supply to turn on the image forming unit by supplying the first DC voltage to the image forming unit, and after the image forming unit has been turned on and a potential difference between both ends of a capacitor connected in parallel with the image forming unit has become equal to a predetermined voltage level, supplying the second DC voltage to the image forming unit.

2. The image forming apparatus as claimed in claim 1, wherein the power supply comprises:
   a converter configured to receive and convert the received AC voltage into the at least one DC voltage; and
   a voltage regulator configured to convert the at least one DC voltage into the first DC voltage or the second DC voltage.

3. The image forming apparatus as claimed in claim 2, wherein the converter comprises:
   a first converter configured to convert the received AC voltage into the first DC voltage;
   a second converter configured to convert the received AC voltage into the second DC voltage; and
   a switcher configured to selectively output the first DC voltage and the second DC voltage to the image forming unit under a control of the controller.

4. The image forming apparatus as claimed in claim 1, further comprising:
   a switcher configured to electrically connect the power supply to the image forming unit or disconnect the power supply from the image forming unit,
   wherein the controller is configured to control the switcher so that the power supply and the image forming unit are connected in response to the first DC voltage being outputted from the power supply.

5. A method of supplying power of an image forming apparatus, comprising:
   receiving and converting an alternating current (AC) voltage into at least one direct current (DC) voltage and outputting the at least one DC voltage;
   converting one of the at least one outputted DC voltage into a DC driving voltage at a predetermined level and outputting the converted DC driving voltage; and
   activating a controller of the image forming apparatus by using the outputted DC driving voltage, turning on an image forming unit of the image forming apparatus by supplying a first DC voltage to the image forming unit, and after the image forming unit has been turned on, supplying a second DC voltage at a higher level than a level of the first DC voltage to the image forming unit,
   wherein the supplying the second DC voltage at the higher level than the level of the first DC voltage to the image forming unit comprises:
      measuring a potential difference between both ends of a capacitor, connected in parallel with the image forming unit, after the image forming unit has been turned on, and
   supplying the second DC voltage to the image forming unit in response to the potential difference between both ends of the capacitor having become equal to a predetermined voltage level.

6. The method as claimed in claim 5, further comprising:
   converting the at least one DC voltage into the first DC voltage or the second DC voltage.

7. The method as claimed in claim 5, further comprising:
   outputting either of the first DC voltage or the second DC voltage to the image forming unit selectively, wherein the receiving and converting the AC voltage into the at least one DC voltage comprises receiving and converting the AC voltage into the first DC voltage and the second DC voltage.

8. The method as claimed in claim 5, further comprising:
   controlling a switcher of the image forming apparatus to electrically connect or disconnect the image forming unit in response to the first DC voltage being outputted from a power supply of the image forming apparatus.

9. The method as claimed in claim 5, further comprising:
  turning off the image forming unit in response to a mode being changed to a power saving mode; and
  in response to the mode being changed to an activation mode, turning on the image forming unit by supplying the first DC voltage to the image forming unit, and after the image forming unit has been turned on, supplying the second DC voltage to the image forming unit.

10. A non-transitory computer readable recording medium including a program to execute a method of supplying power of an image forming apparatus on a computer, the method comprising:
  receiving and converting an alternating current (AC) voltage into at least one direct current (DC) voltage and outputting the at least one DC voltage;
  converting one of the at least one outputted DC voltage into a DC driving voltage at a predetermined level and outputting the converted DC driving voltage; and
  activating a controller of the image forming apparatus by using the outputted DC driving voltage, turning on an image forming unit of the image forming apparatus by supplying a first DC voltage to the image forming unit, and after the image forming unit has been turned on, supplying a second DC voltage at a higher level than a level of the first DC voltage to the image forming unit,
  wherein the supplying the second DC voltage at the higher level than the level of the first DC voltage to the image forming unit comprises:
    measuring a potential difference between both ends of a capacitor, connected in parallel with the image forming unit, after the image forming unit has been turned on, and
    supplying the second DC voltage to the image forming unit in response to the potential difference between both ends of the capacitor having become equal to a predetermined voltage level.

* * * * *